Aug. 3, 1937. G. F. WIKLE 2,088,889
STITCHING DEVICE FOR TIRE BUILDING MACHINES
Filed May 4, 1934

INVENTOR
GEORGE F. WIKLE
BY
ATTORNEY

Patented Aug. 3, 1937

2,088,889

UNITED STATES PATENT OFFICE 2,088,889

STITCHING DEVICE FOR TIRE BUILDING MACHINES

George F. Wikle, Detroit, Mich., assignor, by mesne assignments, to United States Rubber Company, New York, N. Y., a corporation of New Jersey Application May 4, 1934, Serial No. 723,855

13 Claims. (Cl. 154—10)

My invention relates to stitching devices, and in particular to means for smoothing out and compacting superimposed layers of tire building material. In general the device comprises, in combination with the conventional type of disc stitcher, a plurality of spring type belts adapted to engage the tire elements by preceding the conventional type stitcher in its transverse movement over the surface of a tire carcass.

It is an object of my invention to provide an efficient type of stitcher which will impart a greater degree of compactness to the finished carcass.

Another object is the removal of wrinkles from tire elements, and the removal of air pockets from between adjacent layers of tire building material.

A further object is a reduction in manual labor, and also a reduction in the time required to build a tire.

A still further object is the attainment of a greater degree of uniformity in the finished product; and, as a combination of these improvements, I am able to build a tire having superior qualities.

Conventional stitchers generally consist of a pair of disc rollers adapted to engage with a tire carcass under pressure, and are capable of being moved transversely of the tire surface. Under certain conditions this type of stitcher is sufficiently effective to produce the desired results. However, because of the localized pressure of the stitching rollers against the drum while it is rotating, it frequently occurs that there is a tendency for the stock to build up in the form of a wave in front of the stitcher discs. At times this wave in the stock preceding the stitching discs increases to the extent that it cannot be rolled into correct engagement with the underlying layer. This results in imposing non-uniform strains in the layers of the tire elements. Frequently, the wave in the stock becomes surplus, so that it cannot readily be rolled into proper engagement with the remaining portion of the carcass. In such case the wave buckles, becomes folded, and is rolled in a creased relation with the underlying layer. Where this occurs it is necessary for the operator to loosen a portion of the stock in an attempt to iron out that portion of the stock which becomes folded. This is a disadvantage in that it both increases the time expended in building the tire, and results in an improper assembly of the plies or layers.

In the application of treads to a tire carcass it frequently happens that there is a surplus of tread stock on that portion of the tread which forms the sidewalls of the tire. This circumferential increase or surplus in tire treads is generally caused by conditions in the manufacture of the tread, such as a differential shrinkage due to the different thickness of the tread stock. With treads of this type it generally becomes necessary for the tire building operator, after applying the tread to the carcass, to pat down the sidewall portions of the tread throughout the entire circumference of both sidewall portions. If this patting operation is omitted and conventional stitchers are applied, a number of folds and creases will appear in the sidewall portions of the tread.

With the device of my invention, I provide a smoothing means which precedes the stitching means. The smoothing means operates to contact with the tread surface lightly but firmly, thus smoothing out the tread stock and initially adhering it to the underlyng ply before applying the harsher operating stitching discs.

A structure constituting a preferred embodiment of my invention as it is practiced is shown in the accompanying drawing, wherein Fig. 1 is a side elevational view of an embodiment of my invention in relative position to a tire building drum;

Figure 1:
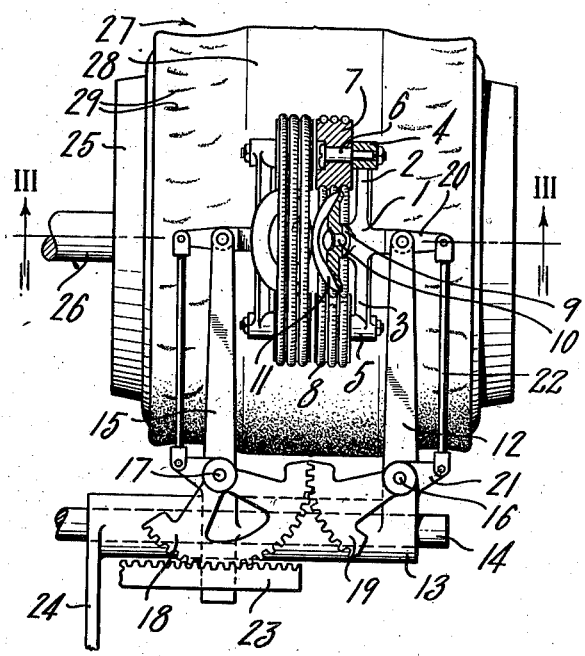

As shown in the drawing, the stitching device as herein disclosed constitutes a pair of stitching units, each operable from the normal position adjacent to each other to a point which is substantially equal to one half the width of a tire carcass. As the units are similar in construction, for the purpose of simplicity I will confine my description to an explanation of a single unit in detail.

Each unit is mounted on a bracket 1. The bracket 1 includes outwardly extendng arms 2 and 3, terminating in bosses 4 and 5 respectively. Each of these bosses 4 and 5 supports a pin or stud 6 upon which a multiple sheave 7 is rotatable. A belt 8 under tension is positioned in each of the grooves of the sheave 7. For practical purposes I find that these belts 8 may be conveniently made from a length of metallic coil spring joined to form an endless band in any convenient manner.

While I have shown a coil spring belt, it is to be understood that any type belt of flexible material may perform the same operation in substantially the same manner.

I also find that a group of three belts 8 constituting one of the units gives good results, although one or a plurality of belts will accomplish substantially equal results.

A boss 9 extending from the bracket 1 and disposed midway between the bosses 4 and 5 carries a stud 10 upon which the stitching disc 11 is rotated. The bracket 1 is supported by an arm 12 attached to a sleeve 13 pivotally mounted on a shaft 14. A second arm 15, also attached to the sleeve 13, supports the second similar stitching unit. Arms 12 and 15 are pivotally joined to the sleeve 13 at 16 and 17 respectively.

Keyed to the arm 15 is a gear segment 18 which cooperates with a gear segment 19 keyed to the arm 12, whereby pivotal movement of the arm 15 carries with it one of the stitching units, and causes a corresponding opposite movement of the arm 12 which carries the other stitching unit.

In order that the stitching units in their lateral movement will retain a substantially vertical position, I show a parallel arm construction comprising an extension 20 of the bracket 1 and an extension 21 of the sleeve 13. A connecting rod 22 is pivotally joined to the extension members 20 and 21.

Associated with the gear segment 18, and in complementary relation therewith, is a gear rack 23 which is movable in tangential relation with the gear segment 18 by any type of conventional hand operated mechanism (not shown). It may thus be seen that movement of the rack 23 will cause the stitching units to move away from each other or toward each other, according to the will of the operator.

Both stitching units, being attached to the sleeve 13, are capable of a pivotal movement in relation to the shaft 14. Means to facilitate this pivotal movement is provided by an arm 24 extending from the sleeve 13, and interconnected with any conventional type of lever (not shown) for convenient manipulation by the operator.

As shown in Fig. 1, the stitching unit and its associated operating mechanism are illustrated in relative position with a conventional tire building drum 25. A shaft 26 supports the building drum 25 by attachment to a conventional tire building standard (not shown). On the building drum 25, I show a tire 27 in pulley band form, substantially assembled; that is, the various plies are superimposed, and the tread 28 is shown in proper position on top of the plies.

As shown in Fig. 1, the tread 28 has been applied to the carcass, but as yet has not been stitched in adhesion with the underlying plies. A number of waves 29 therefore appear in the sidewall portions of the tread. Formerly it has been necessary to pat the tread down along the circumference of the sidewall portion of the tread in order to partially iron out these waves to prevent folds or creases in the tread when the stitcher is applied.

According to my invention, however, it is merely necessary for the operator to splice the tread and to operate the stitching mechanism. In so doing, the operator causes the stitching units to be pivoted about the shaft 14 in such manner that the stitching elements are brought into tangential engagement with the surface of the tread. Simultaneously the operator causes movement of the rack 23 which, through gear segments 18 and 19, causes the stitching units carried by the arms 15 and 12 to move transversely over the surface of the tread 28 which is being rotated by the drum 25. This operation causes the advancing belts 8 to contact lightly with the tread surface so as to lay down any waves which appear upon the tread. The pressure of the spring belts 8 is not sufficient to cause the waves 29 to fold over or buckle, but is merely sufficient to dispose of any of the surplus material forming the waves by uniformly distributing the surplus and lightly compressing it into engagement with the underlying layer. The spring belts, however, are not sufficient to produce proper adhesion between the various plies, and it is therefore necessary to include other means such as the conventional type stitcher disc 11 for effecting the desired pressure to produce proper adhesion.

Figure 2:
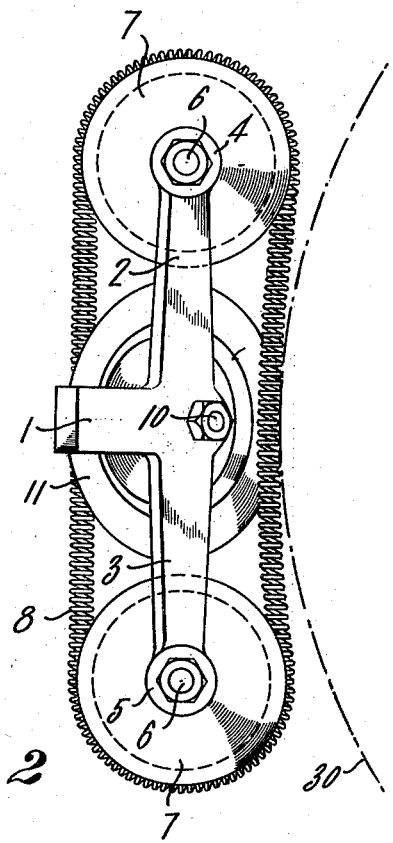
Fig. 2 is an end elevational view of the stitching elements thereof.

As shown in Fig. 2, the spring belts 8 are normally suspended in such manner that they will contact with the tire elements before the stitching disc 11 contacts. Therefore, when the disc 11 is brought into engagement with the tire elements the spring belts 8 are deflected in arcuate engagement with the tire elements. This produces the desired light pressure against the tire components, and insures that it will contact therewith before the stitching disc 11. As shown in Fig. 2, the line 30 defines the arcuate outline of the tire components.

Figure 3:
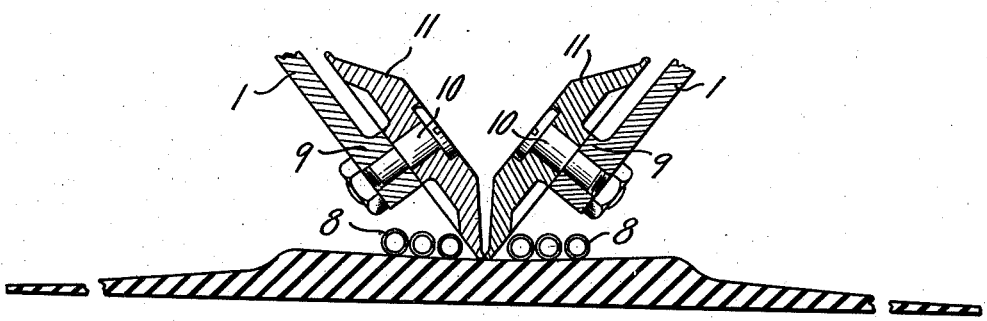
Fig. 3 is a transverse view, in section, taken along lines III—III of Fig. 1 showing the relative position of the stitching elements to a tire tread.

Fig. 3 shows in particular the relation of the spring belts 8 to the stitching discs 11. It will be noted that the stitching discs are positioned in angular relation with the surface of the drum, and are further positioned so that the periphery or marginal portion of the stitching discs meet at the central plane of the drum. The spring belts are positioned in relation to the stitching discs in such manner that the first spring belt is located in close proximity to the marginal portion of the stitching discs. The remaining spring belts are positioned successively in parallel relation with the first positioned spring belt and in close proximity thereto.

With reference to Fig. 3, it may be seen that as the stitching units are moved outwardly and transversely of the drum the spring belts 8 will precede the stitching discs 11 and will operate independently in their pressure engagement with the surface of the tread. In this manner the spring belts 8 operate successively on any waves or wrinkles in the tread or tire fabrics so as to cause same to be stitched down on to the underlying layer by a progressive pressure varying from light engagement to relatively heavy stitching by the conventional stitchers 11.

While I have shown and described a present preferred embodiment of my invention, it will be understood that other embodiments may be made therein without departing from the spirit of the invention or the scope of the appended claims.

Having thus described my invention, what I claim and desire to protect by Letters Patent is:

1. In a stitching device, a plurality of spaced rotatable supports, a resilient member mounted on said supports and movable relative thereto, and a stitching disc mounted on a support in fixed relation to the axis of the supports for said resilient member whereby upon movement of the device the resilient member and disc successively act upon material being stitched.

2. In a stitching device, a plurality of spaced rotatable supports, a coil of wire mounted on said supports and movable relative thereto, and a stitching disc mounted on a support in fixed relation to the axis of the supports for said coil of wire whereby upon movement of the device the coil of wire and disc successively act upon material being stitched.

3. In a stitching device, a plurality of spaced rotatable supports, a plurality of coils of wire mounted on said supports and movable relative thereto, and a stitching disc mounted on a support in fixed relation to the axis of the supports for said coils of wire whereby upon movement of the device the coils of wire and disc successively act upon material being stitched.

4. A stitching device comprising spaced rotatable supports, a resilient element carried thereby and movable relative thereto, and a stitching disc mounted at one side of said element whereby upon lateral movement of the device in one direction laterally of the element the resilient element precedes the disc in engaging successive portions of fabric.

5. A stitching device comprising spaced rotatable supports, a resilient element carried thereby and movable relative thereto, a stitching disc mounted at one side of said element whereby upon lateral movement of the device in one direction the resilient element precedes the disc in engaging successive portions of fabric, and means for moving the device laterally.

6. A stitching device comprising spaced rotatable supports, a resilient element carried thereby and movable relative thereto, a stitching disc mounted at one side of said element whereby upon lateral movement of the device in one direction the resilient element precedes the disc in engaging successive portions of fabric, and means for moving the device laterally, said moving means including means for retaining the supports substantially parallel to their initial positions.

7. A stitching device comprising a plurality of units, each unit comprising a plurality of spaced rotatable supports, a resilient member mounted on and movable relative to said supports, and a stitching disc, the discs of said units initially being substantially in engagement with each other with the resilient members disposed outwardly thereof.

8. A stitching device comprising a plurality of units, each unit comprising a plurality of spaced rotatable supports, a resilient member mounted on and movable relative to said supports, and a stitching disc, the discs of said units initially being substantially in engagement with each other with the resilient members disposed outwardly thereof, and means for laterally moving said units.

9. A stitching device comprising a plurality of units, each unit comprising a plurality of spaced rotatable supports, a resilient member mounted on and movable relative to said supports, and a stitching disc, the discs of said units initially being substantially in engagement with each other with the resilient members disposed outwardly thereof, and means for laterally moving said units while maintaining them in substantial parallelism.

10. A stitching device comprising a plurality of units, each unit comprising a plurality of spaced rotatable supports, an endless coil of wire mounted on and movable relative to said supports, and a stitching disc, the disc of said units initially being substantially in engagement with each other with the endless coils of wire disposed outwardly thereof, and means for laterally moving said units while maintaining them in substantial parallelism.

11. The combination with a tire building drum, of a plurality of stitching units, each unit comprising a plurality of spaced rotatable supports, one or more endless resilient elements mounted on and movable relative to said supports, and a stitching disc, the stitching discs of said units normally being disposed substantially in engagement with each other, and means for bodily moving said units to cause a resilient element to first engage and smooth fabric mounted on said drum and thereafter to cause a stitching disc to engage the fabric.

12. The combination with a tire building drum, of a plurality of stitching units, each unit comprising a plurality of spaced rotatable supports, one or more endless resilient elements mounted on and movable relative to said supports, and a stitching disc, the stitching discs of said units normally being disposed substantially in engagement with each other, and means for bodily moving said units while maintaining them in substantial parallelism to cause a resilient element to first engage and smooth fabric mounted on said drum and thereafter to cause a stitching disc to engage the fabric.

13. In a stitching device, a plurality of spaced rotatable supports, a resilient member mounted on said supports and movable relative thereto, and a stitching disc mounted on a support laterally of said member and in fixed relation to the axes of the supports for said member, said disc terminating substantially at the outer surface of said resilient member when in its stitching position, whereby upon movement of the device the resilient member and disc successively act upon material being stitched.

GEORGE F. WIKLE.